US006979004B2

(12) United States Patent
Otterlee et al.

(10) Patent No.: US 6,979,004 B2
(45) Date of Patent: Dec. 27, 2005

(54) CHILD CARRIER HAVING AN ELECTRONIC DEVICE

(75) Inventors: Timothy A. Otterlee, Marietta, GA (US); Rodney L. Hempen, Braselton, GA (US)

(73) Assignee: Motion Entertainment, LLC, Buford, GA (US)

( * ) Notice: Subject to any disclaimer, the term of this patent is extended or adjusted under 35 U.S.C. 154(b) by 266 days.

(21) Appl. No.: 10/113,310

(22) Filed: Mar. 29, 2002

(65) Prior Publication Data

US 2003/0184032 A1 Oct. 2, 2003

(51) Int. Cl.$^7$ ................................................ B62B 3/00
(52) U.S. Cl. .............................. 280/33.993; 280/33.992
(58) Field of Search ......................... 280/47.34, 47.35, 280/33.991, 33.992, 33.993; 224/409, 411, 274

(56) References Cited

U.S. PATENT DOCUMENTS

| 3,346,271 | A | * | 10/1967 | Parsons ................ 280/33.998 |
| 3,999,774 | A | | 12/1976 | Rehrig |
| 4,046,394 | A | | 9/1977 | Thompson, Jr. |
| 4,067,591 | A | | 1/1978 | Celms |
| 4,268,049 | A | | 5/1981 | Salvador |
| 4,632,411 | A | * | 12/1986 | Badger ................ 280/33.991 |
| 4,674,758 | A | | 6/1987 | Valley et al. |
| 4,968,047 | A | | 11/1990 | Ferris |
| 5,002,292 | A | * | 3/1991 | Myers ................ 280/33.992 |
| 5,074,570 | A | | 12/1991 | Ferris et al. |
| 5,199,728 | A | | 4/1993 | Hutchison |
| 5,255,930 | A | | 10/1993 | Jones et al. |
| 5,289,936 | A | | 3/1994 | Jones et al. |
| 5,312,122 | A | * | 5/1994 | Doty ................ 280/33.992 |
| 5,505,472 | A | | 4/1996 | Trubiano |
| 5,553,876 | A | | 9/1996 | Trubiano |
| 5,702,114 | A | | 12/1997 | Downing et al. |
| 5,702,114 | A | | 12/1997 | Downing et al. |
| 5,704,527 | A | * | 1/1998 | Struzer ................ 224/547 |
| 5,773,954 | A | * | 6/1998 | VanHorn ................ 320/137 |
| 5,836,051 | A | * | 11/1998 | Myers ................ 16/436 |
| 5,865,448 | A | | 2/1999 | Kern et al. |
| 5,961,133 | A | | 10/1999 | Perry |
| 6,098,998 | A | | 8/2000 | Ondrasik |
| 6,126,181 | A | | 10/2000 | Ondrasik |
| 6,155,580 | A | * | 12/2000 | Symons ................ 280/33.991 |
| 6,237,924 | B1 | * | 5/2001 | Reiland et al. ........ 280/33.993 |

(Continued)

FOREIGN PATENT DOCUMENTS

| EP | 133235 | * | 2/1985 | ............ 280/33.992 |
| FR | 2623154 | * | 5/1989 | ............ 280/33.992 |
| GB | 2116490 | * | 9/1983 | ............ 280/33.992 |
| JP | 3-70674 | * | 3/1991 | ............ 280/33.992 |
| WO | 92/05060 | * | 4/1992 | ............ 280/33.992 |
| WO | 93/19967 | * | 10/1993 | ............ 280/33.992 |

OTHER PUBLICATIONS

McCue Corporation, The Whole Bean story, http://www.m-ccuecorp.com/bean/beanstory.html, visited Feb. 26, 2002.
Infant/Toddler Juvenile Product Gift Guide, Kid Tips E–Magazine, http://www.toytips.com/giftguide/infant_toddler.html, first visited Mar. 17, 2002.
Shopper's Aid and Baby Carrier by Mart Cart, Form #020601, product information.

*Primary Examiner*—Frank Vanaman
(74) *Attorney, Agent, or Firm*—Womble Carlyle Sandridge and Rice, PLLC

(57) ABSTRACT

The invention recites a child carrier comprising a seat portion including a seat, a backrest, and a floor. The child carrier further includes a substantially rigid body, at least partially surrounding and supporting the seat portion. The rigid body also includes substantially solid side surfaces and at least partially defines a panel. In addition, the child carrier provides a plurality of wheels supporting the body, and an electronic device supported by the body.

8 Claims, 5 Drawing Sheets

U.S. PATENT DOCUMENTS

| | | |
|---|---|---|
| 6,270,093 B1 | 8/2001 | Johnson et al. |
| D461,612 S | 8/2002 | Lobban et al. |
| 6,464,238 B2 | 10/2002 | Reiland et al. |
| 6,513,817 B2 * | 2/2003 | McCue et al. ............. 280/79.2 |
| 6,536,786 B1 * | 3/2003 | Katoozian .............. 280/33.993 |
| 2001/0028301 A1 | 10/2001 | Geiger et al. |
| 2002/0020977 A1 | 2/2002 | Johnson et al. |
| 2002/0117820 A1 | 8/2002 | McCue et al. |

* cited by examiner

CHILD CARRIER HAVING AN ELECTRONIC DEVICE

BACKGROUND AND SUMMARY OF THE INVENTION

The present invention relates to child carriers, and particularly to formed or molded child carriers having seats for children. More particularly, the present invention relates to formed or molded child carriers that provide entertainment for children.

Child carriers include strollers, shopping carts, attachments to shopping carts, and molded carts commonly used at super markets, home center stores, retail stores, theme parks and zoos. Each year thousands of children are injured in shopping cart, as well as other retail stroller, accidents. Generally, the child becomes bored with the shopping experience and tries to get out of the child carrier. A fall out of a carrier can cause severe injury. In addition, injuries occur when the child pinches his or her fingers in the moving mechanism of a typical seat or when the child reaches out of the carrier to grab something.

Many child carriers are simply wire or plastic mesh constructions that function as containers to carry consumer goods through a store and secondarily provide a seat for a child. Many of these carriers provide seats that are both uncomfortable and easy to escape. If a child becomes bored or uncomfortable, the chances for injury increase. In addition, many of the seats fold or utilize moving pieces that can easily pinch a small child's fingers.

Many child carriers also employ a seat that attaches to a pre-existing cart making the cart/carrier combination larger and heavier than typical child carriers, thus requiring more effort to push and maneuver the cart/carrier combination. Some of these carriers provide rearward looking seats that in many cases make it difficult for the child to observe where the carrier is going.

Other child carriers provide a more comfortable seat but still provide nothing to entertain the child. The child therefore has the tendency to become restless, potentially injuring himself or herself or misbehaving, making shopping more difficult. For example, child carriers used in commercial settings such as shopping malls and in entertainment settings such as zoos and theme parks are often shaped to peak the child's interest but once inside the child quickly becomes bored making the shopping or entertainment experience less enjoyable for the adult.

It is therefore desirable to provide a child carrier that provides an inviting place for a child to sit and also provides some form of entertainment to occupy the child's attention.

Thus, according to the present invention a child carrier provides a seat portion including a seat, a backrest, and a floor. The child carrier further includes a substantially rigid body at least partially surrounding and supporting the seat portion. The rigid body also includes substantially solid side surfaces and at least partially defines a panel. In addition, the child carrier provides a plurality of wheels supporting the body, and an electronic device supported by the body.

In another embodiment of the present invention, a child carrier provides a substantially rigid basket including a front wall, a rear wall, two side walls, and a base. The child carrier further includes a body defining a basket portion, a seat portion, and a push portion, the basket disposed substantially within the basket portion. In addition, the child carrier provides a plurality of wheels supporting the body and the basket, and an electronic device coupled to the body.

In preferred embodiments, the child carrier includes one or more headphone jacks that receive a signal from the electronic device. In addition, the electronic device is radio, a video display device, a computer, or video game player, or the like. Further, the electronic device in many preferred embodiments is interactive allowing the child to play and interact with the device.

In other preferred embodiments, the seat portion is disposed between the basket portion and the push portion such that the seat is above the base of the basket. In addition, in preferred embodiments, a first side wall, a second side wall, a rear wall, the panel and the rear wall of the basket substantially surround the seat and the floor.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
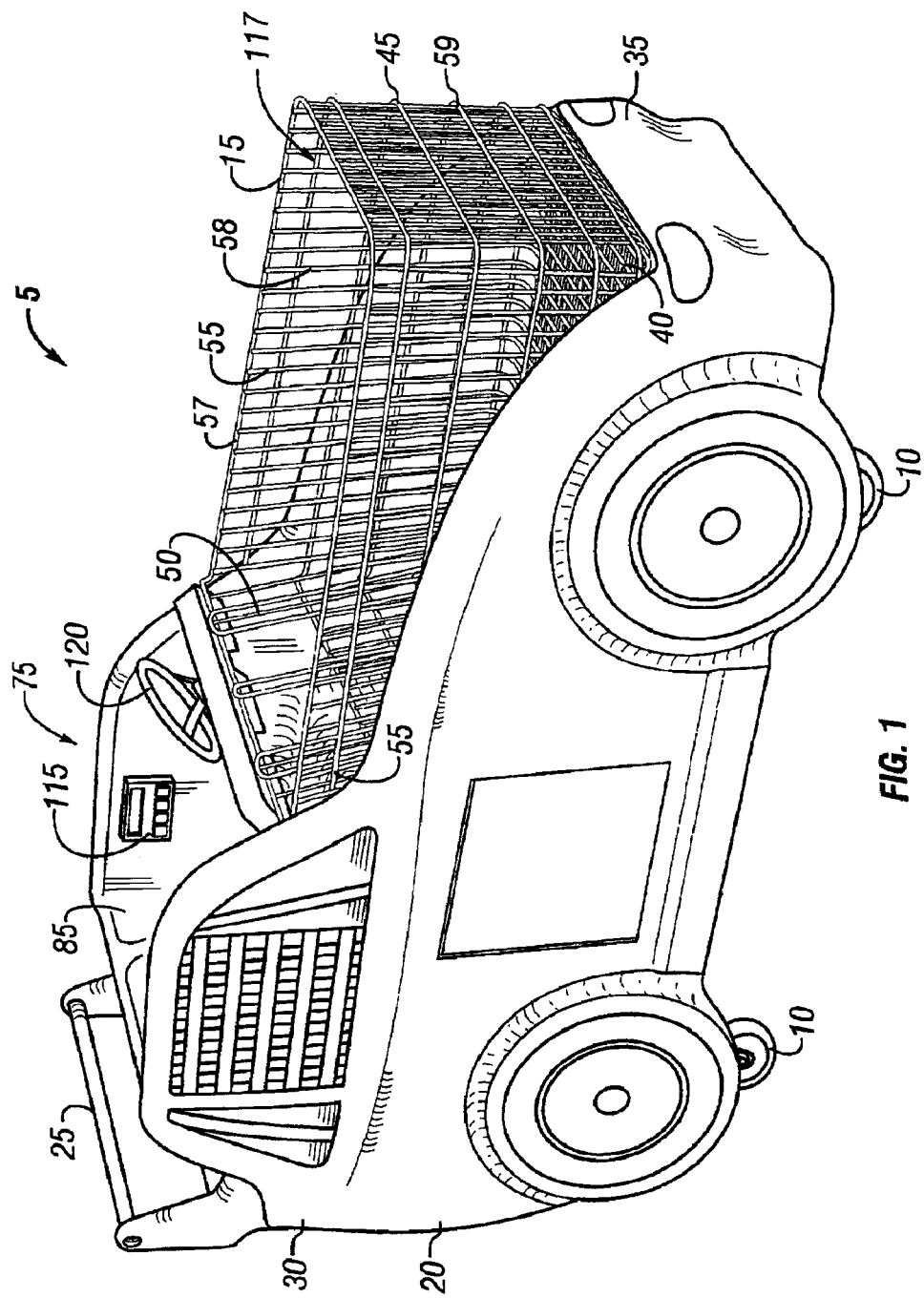
FIG. 1 is a perspective view of a cart in accordance with the invention having an electronic device.
Figure 4:
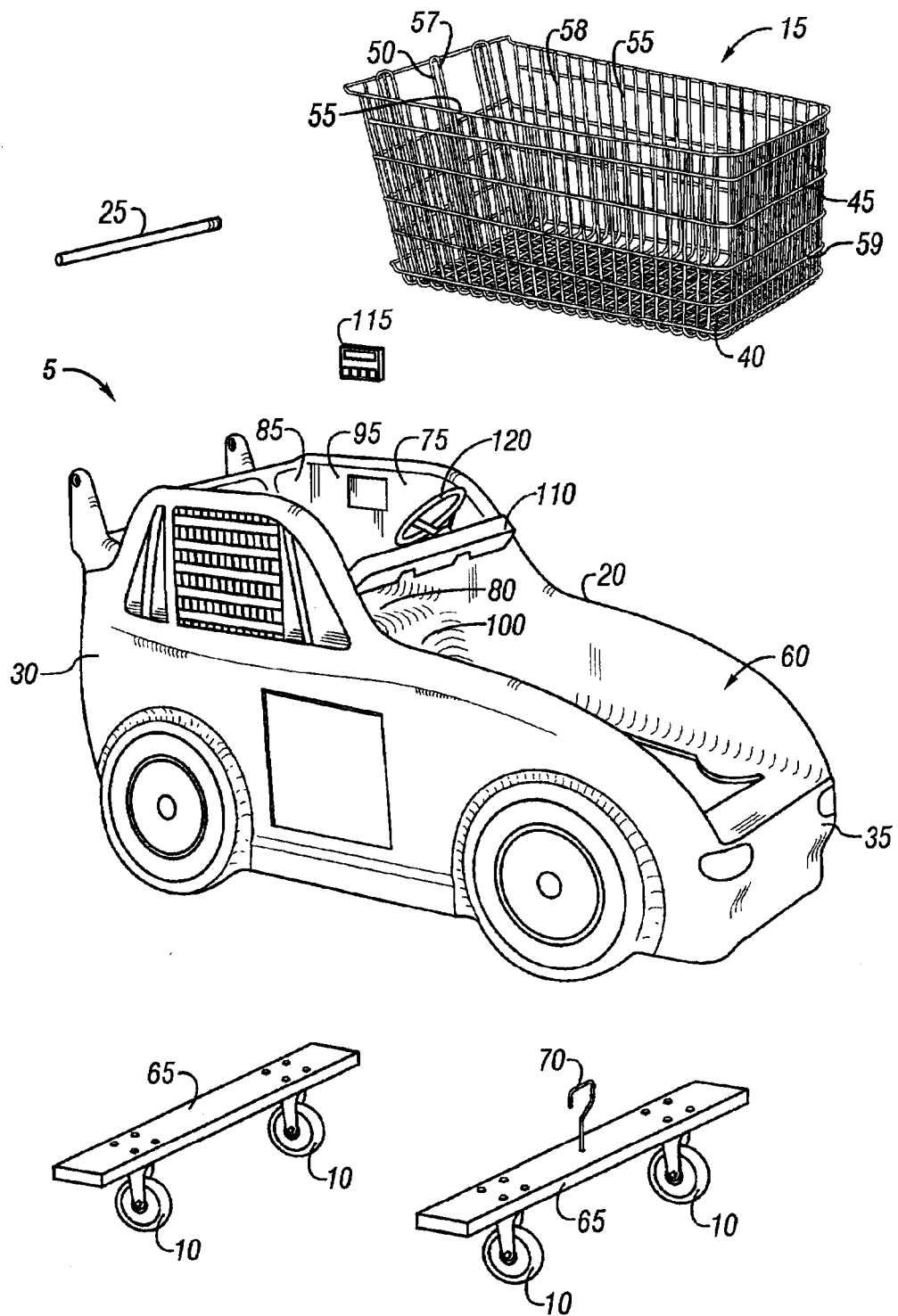
FIG. 4 is an exploded view of the cart of FIG. 1.
Figure 5:
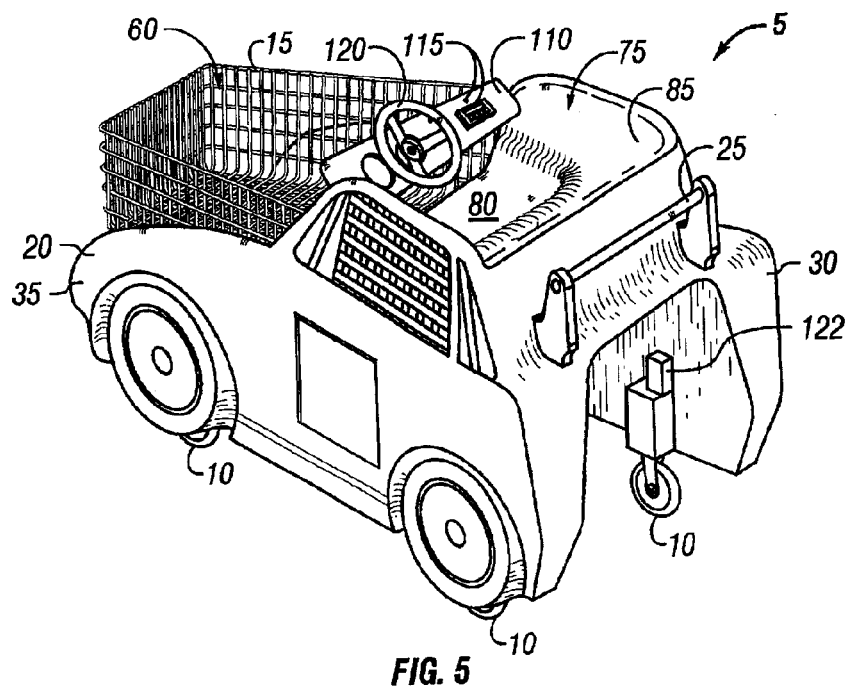
FIG. 5 is a perspective view of the cart of FIG. 1 having an open rear portion.
Figure 6:
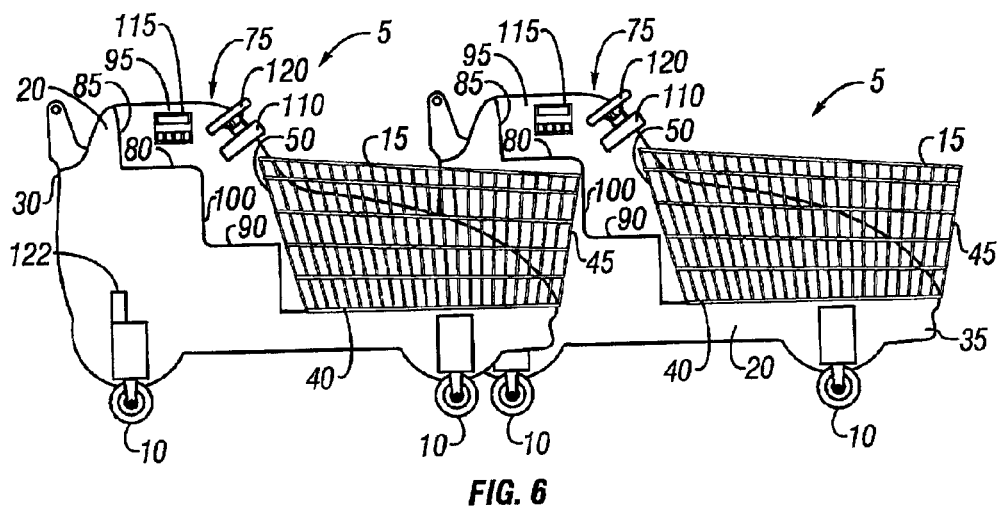
FIG. 6 is a section view of two nested carts in accordance with the present invention.

FIGS. 1 and 4 illustrate a shopping cart 5 in accordance with the invention, the cart 5 includes a plurality of wheels 10, a basket 15, a body 20, and a push bar 25. The wheels 10, or castors, engage the body 20 and support the cart 5 on the ground. The push bar 25 engages a rear portion 30 of the body 20 providing a convenient surface to push and steer the cart 5. The basket 15 is supported and partially surrounded by the body 20.

The embodiment illustrated in FIGS. 1 and 4 uses four wheels 10 located near the extreme corners of the body 20 to support the cart 5. The wheels 10 are fairly standard in the industry, and therefore not critical to the invention. The wheels 10 are placed apart from one another to ensure that the cart 5 remains stable even when loaded with merchandise and children. The embodiment of FIG. 1 employs four wheels 10, other embodiments use only three, while still others use five, six our even more wheels 10. Generally, the rear wheels 10 are aligned and fixed so that they rotate about a common axis. The front wheels 10 on the other hand are generally free to pivot allowing a front portion 35 of the cart 5 to easily maneuver through the narrow aisles commonly found in grocery stores and the like. Other embodiments use wheel arrangements in which all of the wheels 10 are pivotable allowing for a more maneuverable cart 5.

The basket 15 illustrated in FIGS. 1 and 4 has a base 40, a front wall 45, a rear wall 50, and two sidewalls 55. A plurality of lateral and transverse wires 57 cross one another to define each wall 45, 50, 55 and the base 40. The wires 57 firmly connect to one another using known attachment processes (e.g., welding, soldering, brazing, adhesives, mechanical fasteners, and the like). The wires 57 are preferably, steel or aluminum, but, other embodiments can use other materials (e.g., magnesium, titanium or other metals, composites, or plastics). Generally, the wires 57 are painted or coated with a material to prevent injury and to protect the wires 57 from damage. In one embodiment, the four walls 45, 50, 55, and base 40 are made together as a single component. A plurality of U-shaped wires 58 are arranged laterally and transversely to completely define the base 40 and to define the vertical wires of the walls 45, 50, 55. A plurality of ring-shaped wires 59 intertwine with the U-shaped wires 58 to complete the basket 15. The wires 58, 59 are attached to one another or to a basket frame to complete the one-piece basket 15. Other embodiments employ multiple pieces to complete a basket 15. For example, an embodiment that requires a pivotable rear wall 50 would require the rear wall 50 be made separately from the remainder of the basket 15. It is thus contemplated that the basket 15 can be assembled from any number of individual components. It should also be noted that while a wire mesh basket 15 is shown and discussed herein, the invention will function equally well with a solid basket or a basket 15 formed from sheets of plastic rather than wires 57. For example, multiple sheets of plastic formed in any common manner can be attached to one another at adjacent edges to define a basket 15. In this example each wall 45, 50, 55 along with the base 40 would be separate components attached to one another to complete the basket 15.

The basket 15 fits within an opening 60 defined by the body 20. The front portion 35 of the body 20 is shaped to accept the basket 15 therein while providing support to the basket 15. Once installed, the basket 15 is fixedly attached to the body 20. FIG. 4 illustrates one possible attachment mechanism. In FIG. 4 a brace 65 extends across the bottom of the body 20 to partially support the front wheels 10. A hook-shaped bolt 70 engages the wires 57 of the base 40 of the basket 15 and extends through a hole in the brace 65. A nut (not shown) threads onto the end of the hook-shaped bolt 70 fixedly attaching the basket 15 to the body 20. In another embodiment (not shown), bolts and washers extend through the wires 57 of the base 40 of the basket 15. The washers engage the basket 15 while the bolts engage the body 20 firmly clamping the basket 15 to the body 20. In still another embodiment, the basket 15 simply sits in the basket opening 60 provided by the body 20. In this embodiment, the basket 15 can be removed easily to facilitate storage, nesting of the carts, or delivery of groceries or other products to a vehicle or home.

Figure 3:
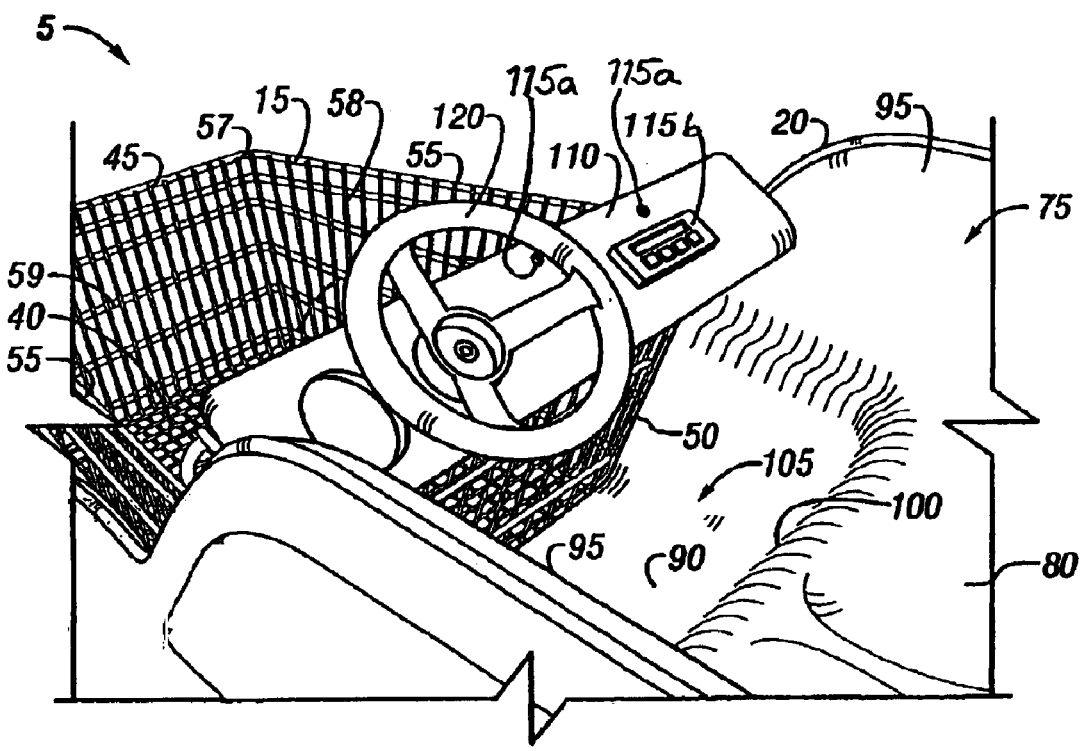
FIG. 3 is a perspective view of the seat portion of the cart of FIG. 1, showing another location for the electronic device.

The body 20 defines the front portion 35, a seat portion 75, and the rear portion 30. The front portion 35 defines the basket opening 60 in which the basket 15 sits when the components are assembled. The seat region 75, illustrated in FIGS. 1 and 3, is disposed above and behind the front portion 35 and further includes a seat 80, a back wall 85, a floor 90, and two sidewalls 95. In addition, a rear kick panel 100 extends from the floor 90 to the seat 80. The seat 80 is sized to support two small children in the seated position. The seat 80, along with the back wall 85, supports the children while the sidewalls 95 obstruct their exit from the cart 5. The children's legs extend into a chamber 105 defined by the two side walls 95, the rear wall 50 of the basket 15, and the rear kick panel 100. The chamber 105 thus completely surrounds the child's legs further enhancing the safety of the cart 5.

Referring to FIG. 3, the seat portion 75 further includes a panel 110 attached to the basket 15 or in some embodiments to the body 20. To further contain the child and to provide for entertainment, the panel 110 is disposed such that it would be immediately in front of a child seated in the seat 80. Electronic devices 115, which will be discussed in more detail below, can be attached to or disposed in the front panel 110 to entertain the child. In addition, some embodiments employ seat belts (not shown) that allow the shopper to strap the child to the seat 80 if desired.

Many processes and materials are available to manufacture the body 20, but the preferred technique involves the use of a rotomolded plastic. Rotomolding allows the body 20 to be manufactured as a substantially rigid single piece rather than multiple pieces, eliminating weaknesses and reducing cost. Other embodiments use processes such as injection molding and hot forming. In addition, while it is important to manufacture a lightweight body, other embodiments use materials other than plastic. For example, fiberglass or other composites are light and provide sufficient strength and durability and therefore would be suitable material substitutes. While it is preferable that the body 20 be made in a single operation, other embodiments employ several sections manufactured separately and then assembled to one another to complete the body 20.

FIG. 1 illustrates an assembled shopping cart 5 in accordance with the invention. The body 20 covers a portion of the sides 55 of the basket 15 but leaves the front 45 and the top 117 open. In another embodiment, the body 20 extends around the basket 15 substantially covering all the walls 45, 50, 55 leaving only the top 117 fully exposed.

To further entertain children seated in the seat portion 75 of the cart 5, some embodiments of the invention provide one or more steering wheels 120 attached to the panel 110 to allow the child to play during the shopping experience. In addition, other embodiments include one or more electronic devices 115 specially suited to the child's needs. For example, one embodiment provides two headphone jacks 115a within the cart 5. The jacks 115a connect to a radio receiver 115b tuned to the frequency of the store's internal broadcast or to any desired frequency. The child can thus listen to music, stories, or other entertainment provided by the store through the headphones without the sound disturbing other patrons. As one having ordinary skill in the art will realize, headphones can be used for the audio output of any device described herein. In yet another embodiment, a video display is provided in addition to the audio device previously described. The video display receives a broadcast from within the store, over the airwaves, or is coupled to a video cassette recorder, digital videodisk (DVD) player, or the like to allow the display of any entertainment desired. In still another embodiment, a computer or video game is coupled to the cart 5 in a position that allows a seated child to interact. A joystick or other interactive device can be coupled to the body 20 of the cart 5 to allow the child to interact. In addition, the steering wheels 120, described above can be interconnected with the game to provide input if desired. A person skilled in the art will realize that many commercially available technologies (e.g., flat screens, plasma screens, closed-circuit television, MP3 players, computers, and the like) can be adapted to the cart 5 or child carrier of the present invention to provide entertainment for children. Small rechargeable batteries 122 hidden within the cart 5 can power many, if not all, of these technologies.

Figure 2:
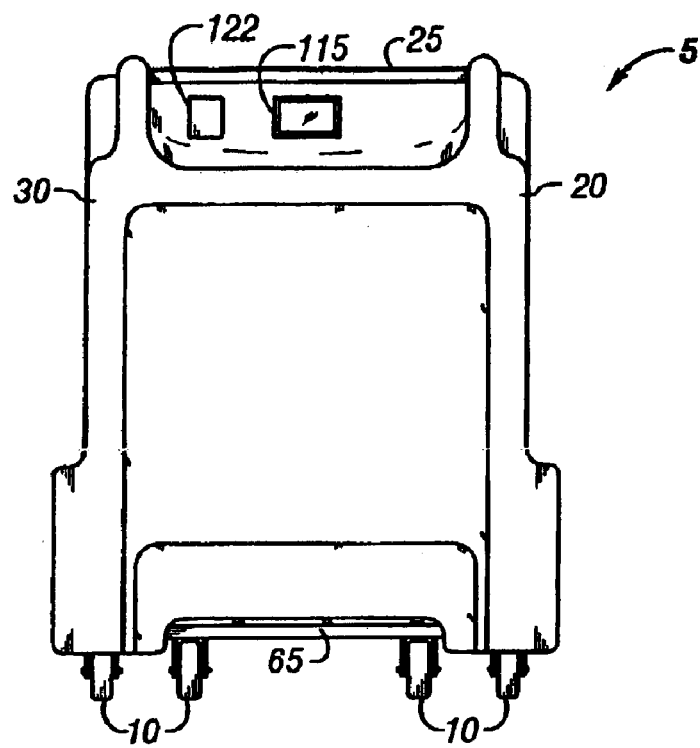
FIG. 2 is a rear view of the cart of FIG. 1, showing another location for the electronic device.

In addition to the above-described devices, another embodiment of the cart 5, shown in FIG. 2, employs a small computer (e.g., PDA, calculator, micro-computer, etc.) powered by a rechargeable battery 122. The computer is supported by the cart 5 in a position that allows the shopper to easily view the display. The computer can be used as a calculator to aid the shopper, or can be programmed with locations of various products within the store, or shopping center, to aid the shopper in locating desired products. In another embodiment (not shown), the computer is coupled to a portable bar code reader allowing the shopper to scan products as they are placed in the cart 5. This greatly aids the shopper in maintaining a budget, and allows a shopper to review items placed in the cart 5 on the computer screen rather than having to search through the various products within the basket 15.

Figure 7:
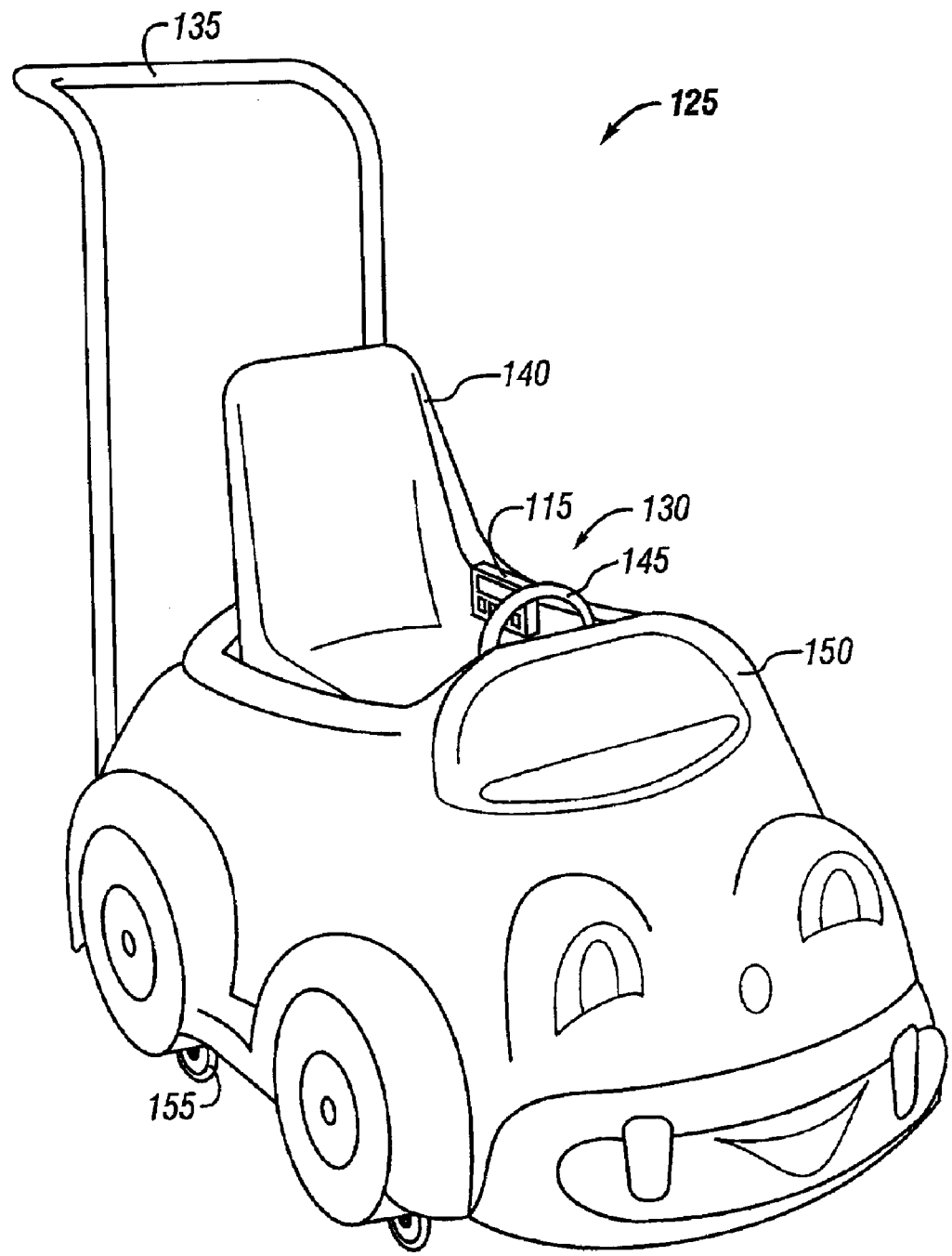
FIG. 7 is a perspective view of another child carrier in accordance with the invention, having an electronic device.

FIG. 7 shows another embodiment of the invention in which an electronic device 115 is provided in a child carrier 125 suitable for carrying children in a retail or other shopping environment. The child carrier 125 does not have a basket like the carts 5 of the previous embodiments but rather performs the function of carrying and entertaining the child. The child carrier 125 has a seat region 130 having a push bar 135, a seat 140, and a steering wheel 145, surrounded by the body 150. The body 150 is supported by a plurality of wheels 155. The electronic device 115 is disposed within the body 150 and supported such that children seated within the child carrier 125 can easily access and interact with the electronic device 115. For example, the device 115 could be a television monitor that receives a signal from within the store. The monitor could display cartoons, stories, or educational programs that are of interest to young children. Other embodiments of the child carrier 125 include a basket (not shown) to aid the shopper. The basket could be hung from the push bar 135 or supported in some other convenient manner.

In another embodiment (not shown), the body is shaped to resemble an animal and the child carrier is used in a zoo or carnival setting. The electronic device 115 could be a radio receiver able to pick up a broadcast emanating from within the zoo. Further, the radio receiver could receive a different signal based on its location allowing, the audio to describe the particular animals in the area.

As a person having ordinary skill in the art will realize, many electronic devices can be adapted to operate within a child carrier 125 or cart 5 as described herein. In addition, a person having ordinary skill in the art will realize that an electronic device as described herein can be adapted to fit within any molded body commonly used in child carriers. In addition, child carriers that use tubular frames may employ electronic devices disposed within a formed panel or piece that attaches to the child carrier. Thus, the present invention should not be limited to only those embodiments described herein.

Although the invention has been described in detail with reference to certain preferred embodiments, variations and modifications exist within the scope and spirit of the invention as described and defined in the following claims.

What is claimed is:

1. A shopping cart including a front and a rear and adapted to carry a rider, the shopping cart comprising:

a substantially rigid plastic body defining a seat portion and a basket portion, the seat portion including a seat, a back wall, a first side wall, and a second side wall, the seat portion oriented such that the rider faces toward the front when positioned within the seat portion;

a panel coupled to the body, the panel, the back wall, the first side wall, and the second side wall cooperating to substantially surround the seat;

a substantially rigid basket formed separately from the body, mounted in front of the seat portion thereof, and including a front wall, a rear wall, two side walls, and a base, the base of the basket securely coupled to the body and disposed within the basket portion of the body;

wherein the seat of the body is elevated above the base of the basket;

a plurality of wheels supporting the body; and an electronic device within the body and capable of producing an audio or visual output.

2. The shopping cart of claim 1, wherein the body at least partially covers the side walls of the basket, and wherein the seat is disposed at a higher level than the base of the basket.

3. The shopping cart of claim 1, wherein the panel and the body are integrally formed.

4. The shopping curt of claim 1, wherein the electronic device comprises a radio receiver.

5. The shopping cart of claim 1, further comprising an electrical connector for the receipt of a headphone plug, and wherein the electronic device produces a signal that is directed to the electrical connector.

6. The shopping cart of claim 1, wherein the electronic device comprises a video display device and an audio/video receiver.

7. The shopping cart of claim 1, wherein the electronic device comprises an audio/video storage device and an audio/video playback device.

8. The shopping cart of claim 1, wherein the electronic device is disposed substantially within the panel.

\* \* \* \* \*